US011187806B2

(12) United States Patent
Rohani et al.

(10) Patent No.: US 11,187,806 B2
(45) Date of Patent: Nov. 30, 2021

(54) LIDAR SCANNING SYSTEM

(71) Applicants: Mohsen Rohani, Gatineau (CA); Mohammad Mehdi Mansouri Rad, Ottawa (CA); Song Zhang, Ottawa (CA)

(72) Inventors: Mohsen Rohani, Gatineau (CA); Mohammad Mehdi Mansouri Rad, Ottawa (CA); Song Zhang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 1164 days.

(21) Appl. No.: 15/657,405

(22) Filed: Jul. 24, 2017

(65) Prior Publication Data
US 2019/0025430 A1    Jan. 24, 2019

(51) Int. Cl.
*G01C 3/08*    (2006.01)
*G01S 17/89*    (2020.01)
(Continued)

(52) U.S. Cl.
CPC .............. *G01S 17/89* (2013.01); *G01S 7/4811* (2013.01); *G01S 7/4814* (2013.01);
(Continued)

(58) Field of Classification Search
CPC ...... G01S 17/89; G01S 17/931; G01S 7/4814; G01S 17/42; G01S 7/4811; G01S 7/4817; G01S 7/4818
See application file for complete search history.

(56) References Cited

U.S. PATENT DOCUMENTS

| 5,006,721 A | 4/1991 | Cameron et al. |
| 7,221,438 B2 | 5/2007 | Harris |
| (Continued) | | |

FOREIGN PATENT DOCUMENTS

| CN | 101395480 A | 3/2009 |
| CN | 101576697 A | 11/2009 |
| (Continued) | | |

OTHER PUBLICATIONS

U.S. Appl. No. 62/473,689, filed Mar. 20, 2017, Hosseini, Ehsan Shah.
(Continued)

*Primary Examiner* — Samantha K Nickerson
(74) *Attorney, Agent, or Firm* — Ridout and Maybee LLP

(57) ABSTRACT

A LIDAR scanning system. The LIDAR system comprises a laser configured to transmit laser light. An optical switch is optically coupled to the laser to receive laser light via an input port. The optical switch includes a plurality of output ports for transmitting received laser light to an environment to be scanned. Each of the plurality of output ports is oriented in a different direction. A detector subsystem is positioned to receive reflected laser light. A processor is coupled to the detector subsystem. The processor is configured to receive data signals from the detector subsystem. The processor is also configured to determine a distance from the LIDAR scanning system to one or more objects in an environment of the LIDAR scanning system based on a time between a transmission of beams of laser light and a reception of a reflection of the beams of laser light.

24 Claims, 9 Drawing Sheets

(51) Int. Cl.
  *G01S 7/481* (2006.01)
  *G01S 17/42* (2006.01)
  *G01S 17/931* (2020.01)

(52) U.S. Cl.
  CPC ............ *G01S 7/4817* (2013.01); *G01S 17/42* (2013.01); *G01S 17/931* (2020.01); *G01S 7/4818* (2013.01)

(56) References Cited

U.S. PATENT DOCUMENTS

| | | | |
|---|---|---|---|
| 7,936,448 B2 | 5/2011 | Albuquerque et al. | |
| 8,675,181 B2 | 3/2014 | Hall | |
| 9,069,061 B1* | 6/2015 | Harwit | G01S 7/4818 |
| 2010/0157280 A1 | 6/2010 | Kresimir et al. | |
| 2011/0216304 A1* | 9/2011 | Hall | G01S 7/4813 |
| | | | 356/4.01 |
| 2012/0195594 A1* | 8/2012 | Sakauchi | H04J 14/02 |
| | | | 398/48 |
| 2015/0055115 A1 | 2/2015 | Pedersen et al. | |
| 2015/0296201 A1 | 10/2015 | Banks | |
| 2016/0299228 A1* | 10/2016 | Maleki | H01S 3/00 |
| 2017/0153319 A1* | 6/2017 | Villeneuve | H01S 3/08086 |
| 2017/0155225 A1 | 6/2017 | Villeneuve et al. | |
| 2017/0371227 A1 | 12/2017 | Skirlo et al. | |
| 2018/0267250 A1 | 9/2018 | Hosseini | |
| 2019/0324214 A1 | 10/2019 | Hosseini | |

FOREIGN PATENT DOCUMENTS

| | | |
|---|---|---|
| CN | 106154281 A | 11/2016 |
| CN | 206114893 U | 4/2017 |
| CN | 106773028 A | 5/2017 |
| CN | 206147096 U | 5/2017 |
| EP | 2453253 A1 | 5/2012 |
| EP | 3165874 A1 | 5/2017 |
| JP | 2003302599 A | 10/2003 |
| JP | 2005009956 A | 1/2005 |
| JP | 2009539062 A | 11/2009 |
| WO | 2003/048804 A1 | 6/2003 |
| WO | 2007/017641 A1 | 2/2007 |
| WO | 2013/139347 A1 | 9/2013 |
| WO | 2016195592 A1 | 12/2016 |

OTHER PUBLICATIONS

S320 Photonic Switch Hardware User Manual, CALIENT Technologies Inc., 2012.
S320 Photonic Switch Product Sheet, CALIENT Technologies Inc., 2013.
Steve Frisken et al., "Flexible WSS accommodates advanced network architectures and modulation formats", Nov. 1, 2009.
Fujitsu Develops Optical Switch that Cuts Power Consumption by Half: Solution for ever-increasing network equipment power consumption, Nov. 9, 2010.
HDL-64E S3 Product Sheet, Velodyne LiDAR, Inc., 2017.
HDL-32E Product Sheet, Velodyne LiDAR, Inc., 2017.
VLP-16 Puck Product Sheet, Velodyne LiDAR, Inc., 2017.
M8 Product Sheet, Quanergy Systems Inc., 2016.
S3 Product Sheet, Quanergy Systems Inc., 2016.
S3-Qi Product Sheet, Quanergy Systems Inc., 2016.
Solid-state LiDar company Quanergy raises $90 M in Series B; Valuation Passes $1B, Green Car Congress, 2016.

* cited by examiner

LIDAR SCANNING SYSTEM

TECHNICAL FIELD

The present disclosure relates to LIDAR (Light Detection And Ranging), and in particular, to a LIDAR scanning system.

BACKGROUND

LIDAR systems, as known as laser scanning and three-dimensional (3D) scanning, are used in mapping, surveying and object detection among other uses. LIDAR has many applications including in robotics, autonomous and vehicles (e.g., cars, robots) and other sensing applications. LIDAR systems emit laser light and detect reflections in the emitted laser light. By measuring the time-of-flight (TOF) between the emission of the laser light and detection of the reflected laser light, a distance between the LIDAR unit and the object which reflected the laser light may be calculated.

Digital signal processing may be performed by the LIDAR system on transmitted/received signals to generate a 3D map of the surrounding environment that may be used for display, navigation, autonomous driving, or other similar applications.

SUMMARY

In one aspect of the present disclosure, there is provided a LIDAR scanning system. The system comprises a laser configured to transmit laser light. An optical switch is optically coupled to the laser to receive laser light via an input port. The optical switch includes a plurality of output ports for transmitting received laser light to an environment to be scanned. Each of the plurality of output ports is oriented in a different direction. A detector subsystem is positioned to receive reflected laser light. A processor is coupled to the detector subsystem. The processor is configured to receive data signals from the detector subsystem corresponding to the received laser light. The processor is also configured to determine a distance from the LIDAR scanning system to one or more objects in the environment of the LIDAR scanning system based on a time between a transmission of beams of laser light and a reception of a reflection of the beams of laser light.

In some examples, each of the plurality of output ports is located at a different position about a housing of the LIDAR scanning system to have a different field of view (FOV). In some examples, the plurality of output ports is configured to so that the FOV of adjacent output ports provides a field of coverage in an area of the environment to be scanned.

In some examples, the plurality of output ports is configured to have a horizontal field of view (HFOV) of 360 degrees.

In some examples, the plurality of output ports is configured to have a vertical angular resolution (VAR) of 2 degrees.

In some examples, the plurality of output ports is configured to have a horizontal angular resolution (HAR) 0.1 degree.

In some examples, the processor is a digital signal processor. In other examples, the processor is a controller of a vehicle control system.

In some examples, the laser is configured to transmit pulsed light and the optical switch is optically coupled to the laser to receive the pulsed light from the laser. In some examples, the processor is configured to determine a distance from the LIDAR scanning system to objects in the environment based on a time between transmitted light pulses and received light pulses.

In some examples, the laser is an infrared laser configured to transmit infrared light, and wherein the detector subsystem is an infrared detector subsystem configured to receive reflected infrared light.

In some examples, the system comprises a plurality of lasers, each laser being configured to transmit a different type of light, wherein the detector subsystem is configured to receive each of the different types of light emitted by the plurality of lasers. In some examples, each laser in the plurality of lasers is configured to transmit a respective one of infrared light or one or more types of visible light. In some examples, the plurality of lasers comprise an infrared laser to configured to transmit infrared light, a blue laser configured to transmit blue light, a red laser configured to transmit a red light, and a green laser configured to transmit a green light, wherein the detector subsystem comprises one or more infrared detectors configured to receive infrared light reflected from objects in the environment, one or more blue detectors configured to receive blue light reflected from objects in the environment, one or more red detectors configured to receive red light reflected from objects in the environment, and one or more green detectors configured to receive green light reflected from objects in the environment.

In some examples, the plurality of output ports is configured to have an angular field of view (AFOV) of 30 degrees. In some examples, the AFOV ranges between +15 degrees from a horizontal reference plane to −15 degrees from the horizontal reference plane.

In some examples, the processor controls a direction in which the laser light is transmitted (e.g., a scanning direction) by controlling optical switching blocks in the optical switch to select an output port in the plurality of output ports through which the laser light is transmitted. In some examples, wherein the processor causes the system to perform a scanning cycle by cycling the laser light through each of the output ports of the optical switch.

In some examples, the output ports are arranged in a plurality of layers. In some examples, the output ports of each layer are annularly arranged to form a ring. In some examples, the output ports are arranged in a plurality of annular rings. In some examples, each layer has 3,600 output ports and the output ports of each layer are radially offset from each other by 0.1 degree to provide a horizontal angular resolution (HAR) of 0.1 degree and an HFOV of 360 degrees.

In some examples, the output ports are arranged in 16 layers, wherein the output ports of each layer are angularly offset from the output ports in adjacent layers by 2 degrees to provide a vertical angular resolution (VAR) of 2 degrees and an AFOV of 30 degrees.

In some examples, the system further comprises a plurality of microlenses, wherein each output port in the plurality of the output ports is optically coupled with a microlens to focus the laser light during transmission. In some examples, each output port in the plurality of the output ports is optically coupled with a microlens array to focus the laser light during transmission.

In some examples, the processor is configured to generate a three dimensional (3D) map of the environment based on the determined distance to one or more objects in the environment.

In some examples, the detector subsystem comprises a plurality of detector elements for receiving reflected laser light each located at different positions about the LIDAR scanning system.

In some examples, wherein each of the plurality of detector elements are located proximate to an output port of the optical switch with which the detector element is paired.

In some examples, the LIDAR scanning system is a two dimensional (2D) scanning system. In other examples, the LIDAR scanning system is a two and a half (2.5D) dimensional scanning system. In yet other examples, the LIDAR scanning system is a three dimensional (3D) scanning system.

In another aspect of the present disclosure, there is provided a vehicle control system for a vehicle. The vehicle control system comprises a laser configured to transmit laser light. An optical switch is optically coupled to the laser to receive laser light via an input port. The optical switch includes a plurality of output ports for transmitting received laser light to an environment to be scanned. Each of the plurality of output ports is oriented in a different direction. A detector subsystem is positioned to receive reflected laser light. A processor is coupled to the detector subsystem. The processor is configured to receive data signals from the detector subsystem corresponding to the received laser light. The processor is coupled a memory storing executable instructions that, when executed by the processor, cause the vehicle control system to determine a distance from vehicle to one or more objects in the environment of the vehicle based on a time between a transmission of beams of laser light and a reception of a reflection of the beams of laser light.

In a further aspect of the present disclosure, there is provided a vehicle. The vehicle comprises a mechanical system for moving the vehicle, and a drive control system coupled to the mechanical system for controlling the mechanical system. The vehicle also comprises a vehicle control system coupled to the drive control system. The vehicle control system comprises a laser configured to transmit laser light. An optical switch is optically coupled to the laser to receive laser light via an input port. The optical switch includes a plurality of output ports for transmitting received laser light to an environment to be scanned. Each of the plurality of output ports is oriented in a different direction. A detector subsystem is positioned to receive reflected laser light. A processor is coupled to the detector subsystem. The processor is configured to receive data signals from the detector subsystem corresponding to the received laser light. The processor is coupled a memory storing executable instructions that, when executed by the processor, cause the vehicle control system to determine a distance from the vehicle to one or more objects in the environment of the vehicle based on a time between a transmission of beams of laser light and a reception of a reflection of the beams of laser light.

In yet a further aspect of the present disclosure, there is provided a sensor network comprises at least one LIDAR scanning system. The system comprises a laser configured to transmit laser light. An optical switch optically coupled to the laser to receive laser light via an input port. The optical switch includes a plurality of output ports for transmitting received laser light to an environment to be scanned. Each of the plurality of output ports is oriented in a different direction. A detector subsystem is positioned to receive reflected laser light. A processor is coupled to the detector subsystem. The processor is configured to receive data signals from the detector subsystem corresponding to the received laser light. The processor is also configured to determine a distance from the LIDAR scanning system to one or more objects in the environment of the LIDAR scanning system based on a time between a transmission of beams of laser light and a reception of a reflection of the beams of laser light.

In yet a further aspect of the present disclosure, there is provided a method of controlling a LIDAR scanning system. The LIDAR scanning system comprises a laser configured to transmit light, and an optical switch including an input port optically coupled to the laser to receive light from the laser during transmission. A plurality of output ports for transmitting the received laser light to an environment to be scanned. Each of the plurality of output ports is oriented in a different direction. The method comprises controlling the laser to emit laser light, and controlling a direction in which the laser light is transmitted by selecting an active output port in the plurality of output ports through which the laser light is transmitted. A time each output port is the active output port may be controlled to set a scanning rate.

In some examples, the laser light is cycling through each of the output ports of the optical switch in a scanning cycle. In some examples, the output ports are arranged in a number of layers, the direction in which the laser light is transmitted is defined by a scanning sequence in which the active output port is selected sequentially layer-by-layer and port-by-port. In some examples, the output ports are arranged in a number of annular rings, the direction in which the laser light is transmitted is defined by a scanning sequence in which the active output port is selected column-by-column and port-by-port.

DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine readable medium.

Figure 1:
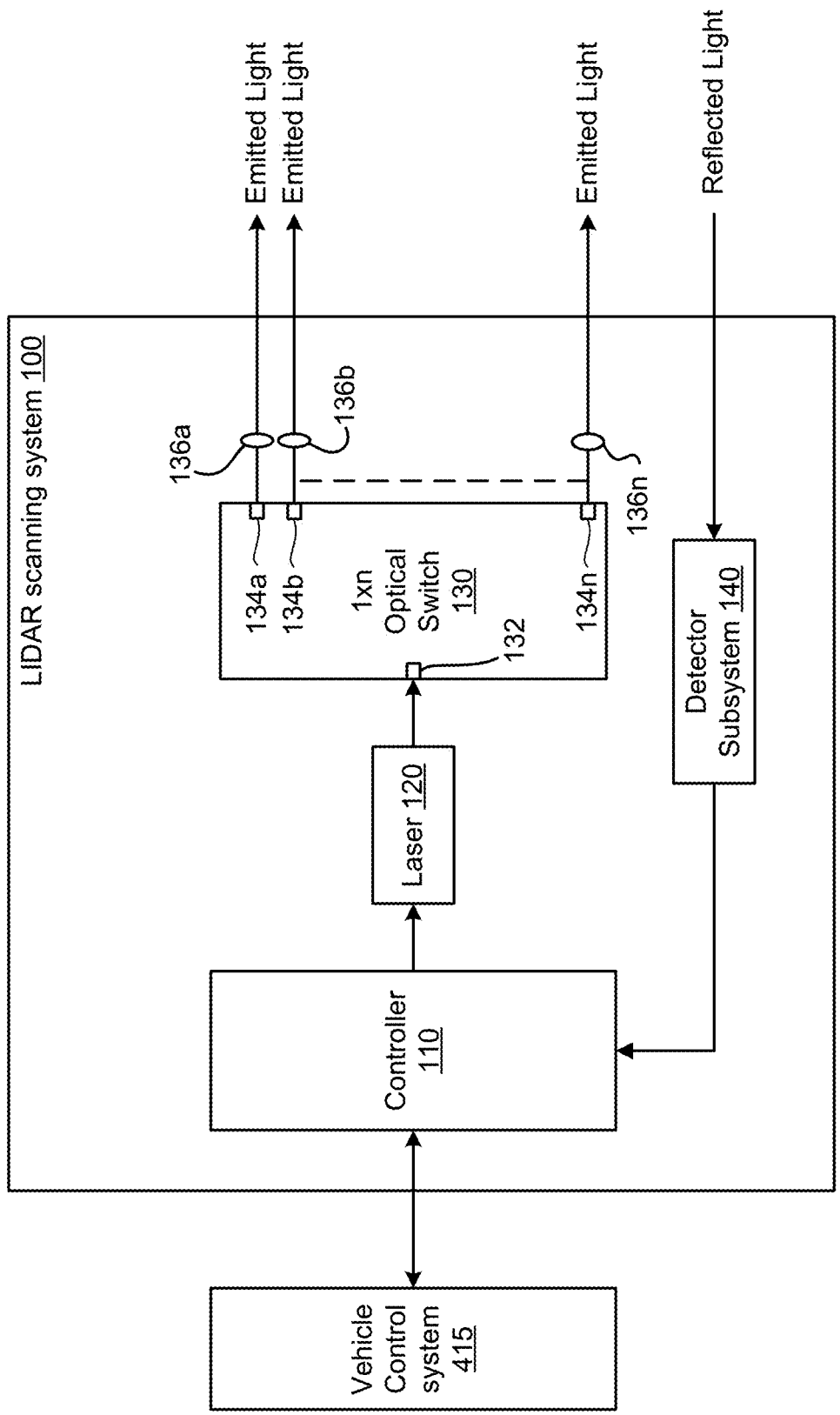
FIG. 1 is a block diagram of a LIDAR scanning system in accordance with one example embodiment of the present disclosure.

Reference is first made to FIG. 1 which illustrates a simplified block diagram of a LIDAR scanning system 100 in accordance with one example embodiment of the present disclosure. The LIDAR scanning system 100 comprises a controller 110, including one or more processors (e.g., microprocessors), a laser source 120, an optical switch 130 optically coupled to the laser source 120, and a detector subsystem 140 comprising one or more detectors, such as one more avalanche photodiodes (APDs), charge-coupled device (CCD) sensors, complementary metal-oxide-semiconductor (CMOS) sensors, or micro-electro-mechanical systems (MEMS) sensors.

The controller 110 of the LIDAR scanning system 100 may be coupled to a host system, which may be a fixed or mobile application. The host system may comprise, but is not limited to, a three dimensional object scanner, a vehicle control system used for automated parking assistance, automated driver assistance (e.g., blind spot and collision avoidance), semi or fully autonomous driving, a robotic navigation system, a security camera, a monitoring or surveillance system, a sensor network for monitoring or surveillance of an area of the environment.

The laser source 120, comprising one or more lasers, is configured to generate and transmit laser light, such as a laser beam. The laser source 120 may generate Gaussian beams. The laser source 120 may transmit pulsed laser light (e.g., pulsed beams). The laser source 120 typically emits infrared (IR), such as near infrared (NIR) light, but may emit one or more types of visible light and/or or possibly ultraviolet (UV) light in addition to, or instead of, infrared light. The laser source 120 may comprise a plurality of lasers, each laser being configured to transmit a different type of light. In one example, each laser in the plurality of lasers is configured to transmit a respective one of infrared light or one or more type of visible light. In one example, the plurality of lasers comprises an infrared laser configured to transmit infrared light, a blue laser configured to transmit blue light, a red laser configured to transmit a red light, and a green laser configured to transmit a green light. These laser lights may be controlled to send laser beams simultaneously or non-concurrently.

Those skilled in the art will understand that other light sources, such as an LED, may be adapted to substitute for a laser source. However, such a substitution must account for the system requirements, and may be accompanied by additional modification e.g. collimation, to meet requirements.

The detector subsystem 140 detects reflected laser light using the one or more detectors, generates and outputs a data signal corresponding to the received laser light that is sent to the controller 110. The controller 110 may comprise a digital signal processor (DSP) which uses the output from the detector subsystem 140 to create a determine a distance from the LIDAR scanning system 100 to one or more objects in the environment of the LIDAR scanning system 100 based on a time between a transmission of beams of laser light and a reception of a reflection of the beams of laser light. An analog-to-digital converter (ADC) may convert the data signals from the detector subsystem 140 into digital form for further processing by the DSP. The controller 110 may also generate a 3D map of the environment based on the determined distance to one or more objects in the environment. Although a DSP is used in the described embodiment, a Field Programmable Gate Array (FPGA) or other processor may be used in other embodiments. Alternatively, the data signal generated by the detector subsystem 140 may be sent to a controller of the host system and the functions of the DSP may be performed by the processor of the host system.

The controller 110 may control the LIDAR scanning system 100 using one or a combination of software, firmware, hardware or a combination thereof. The software may be executed by the controller 110. Coding of software for carrying out the functionality described herein is within the scope of a person of ordinary skill in the art provided the present disclosure. Machine readable code executable by the controller 110 to perform the functionality described may be stored in a non-transitory machine readable medium of the LIDAR scanning system (not shown). Alternatively, the functions of the controller 110 may be performed by the processor of the host system.

The detector subsystem 140 is configured to receive light corresponding to the type(s) of light emitted by the laser source 120. When the laser source 120 transmits more than one type of light, the detector subsystem 140 is configured to receive each of the different types of light emitted by the laser source 120 (e.g., by the plurality of lasers). For example, when the LIDAR scanning system 100 comprises an infrared laser to configured to transmit infrared light, a blue laser configured to transmit blue light, a red laser configured to transmit a red light, and a green laser configured to transmit a green light, the detector subsystem 140 comprises one or more infrared detectors configured to receive infrared light reflected from objects in the environment, one or more blue detectors configured to receive blue light reflected from objects in the environment, one or more red detectors configured to receive red light reflected from objects in the environment, and one or more green detectors configured to receive green light reflected from objects in the environment. A receiving optics assembly (not shown) may be provided in front of the one or more detectors of the detector subsystem 140. The one or more detectors of the detector subsystem 140 may be connected to the controller via fibre optic cables (not shown). The mechanism used for the detection of multiple laser lights depends on the desired detailed implementations and requirements and may be based on both coherent (heterodyne and homodyne) or incoherent (intensity based) schemes.

The optical switch 130 is an 1×n optical switch with 1 input port 132 configured to receive laser light from the laser source 120 and n output ports 134, represented individually by reference numerals 134a, 134b . . . 134n. The 1×n optical switch 130, under control of the controller 110, provides a programmable beam that may be used to direct the light beam into n directions. The laser source 120 may be directly optically coupled to the input port 132 of the optical switch 130. Alternatively, the laser source 120 may be optically coupled to the input port 132 of the optical switch 130 via fibre optic cables or the like (not shown).

The optical switch 130 may be constructed using MEMS, liquid crystal on silicon (LCoS), silicon photonics (SiPh) or other suitable construction. The switch architecture may be customized for the best performance of the LIDAR scanning system 100. Depending on the technology employed to fabricate the optical switch 130, a variety of sweeping speeds (i.e., scan rates) may be achieved from sub-hertz to megahertz (MHz). SiPh may offer improved performance compared with other architectures and comparison. The number of output ports 134, the spacing between the output ports 134, and angle between the output ports 134 may be varied based design requirements (technical or customer). Typically, the spacing and angle between the output ports 134 is the same to simplify processing of the collected data as well as provide uniform coverage of the corresponding field of view of the LIDAR scanning system 100.

The output ports 134 of the optical switch 130 are configured to provide a field of coverage (FOC) in the area being scanned, which is typically gapless. The output ports 134 are each oriented to output laser light from the optical switch 130 in one of a number of different directions in space. The output ports 134 are each mounted or otherwise located at a different position about the LIDAR scanning system 100 so that each output port 134 has a different field of view (FOV) and is directed to cover/point a different area in space. For example, the LIDAR scanning system 100 may comprise a housing (or rigid case) with the output ports 134 spaced apart around the housing so that each output port 134 has a different FOV. Alternatively, the output ports 134 and paired detectors may be mounted or otherwise located in a housing of the host system. In some examples, the FOV of adjacent output ports 134 may be partially overlapping.

A microlens 136 or a microlens array comprising a plurality of microlenses may be located at each output port 134 to assist in focusing the laser beam. The microlenses 136 may be part of a transmitting optics assembly (not shown) located at each output port 134. The optical microlens may also help shape the beam for the desired angular resolution of the LIDAR device. This involves design and customization to prepare the beam before transmitting the beam from the optical switch 100. These requirements are typically driven by the LIDAR specifications such as required angular resolution, etc. Therefore, depending on the application requirements, other optical components such as beam collimator, beam size expander, etc. may be used in combination with the microlens 136 after the optical switch 130. The specifications for the coupling between the optical switch and the environment may vary depending on the application requirements. Examples of suitable microlenses are those made by Precision Optics Corporation (Gardner, Mass., United States of America).

Figure 2A:
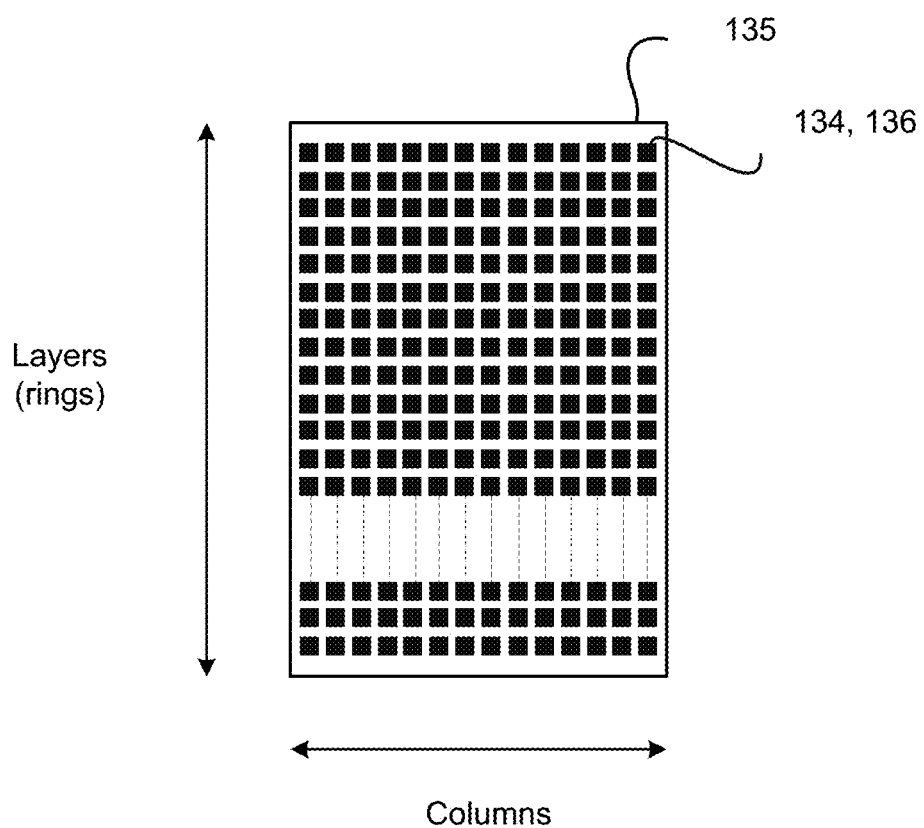
FIG. 2A is a schematic side view of a LIDAR scanning system in illustrating output ports and microlenses arranged in a number of concentric rings.
Figure 2B:
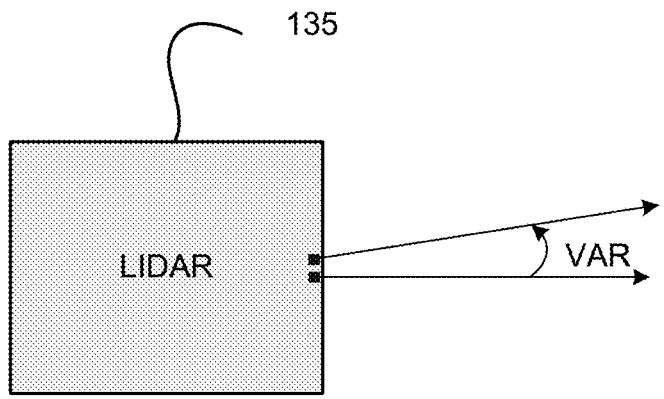
FIG. 2B is a schematic side view of the LIDAR scanning system of FIG. 2A illustrating the horizontal field of view of the LIDAR scanning system.
Figure 2C:
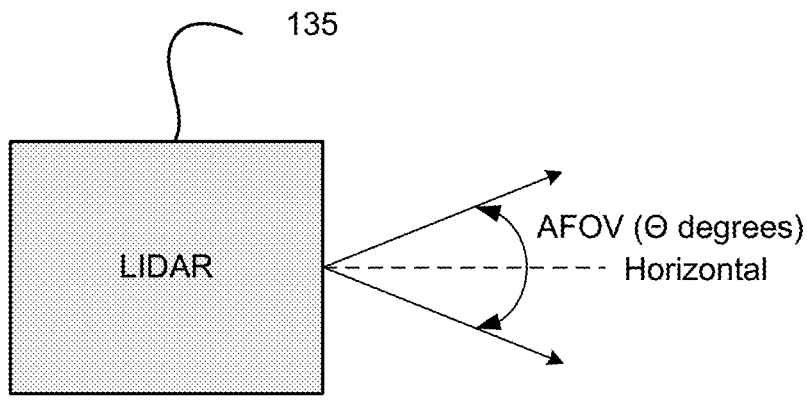
FIG. 2C is a schematic side of the LIDAR scanning system of FIG. 2A in illustrating an angular field of view.
Figure 2D:
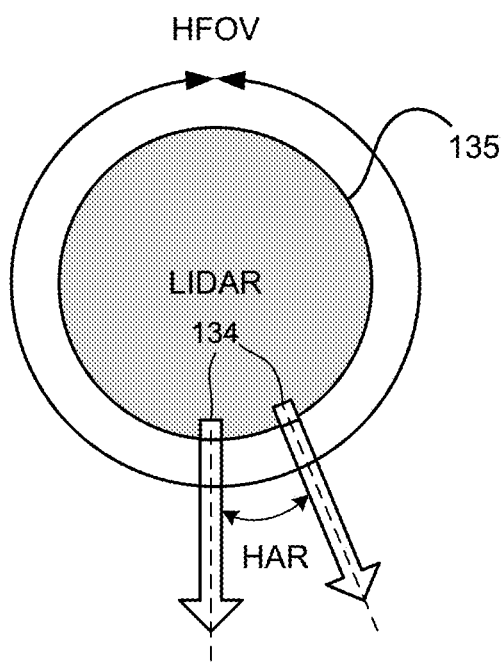
FIG. 2D is a schematic top view of the LIDAR scanning system of FIG. 2A illustrating the horizontal field of view and the horizontal angular resolution.

FIGS. 2A to 2D show an example embodiment of the LIDAR scanning system 100 in which the LIDAR scanning system 100 comprises a generally cylindrical shaped housing 135. As shown in FIG. 2A, the output ports 134 are arranged in one or more layers with the output ports 134 of each layer angularly offset from the output ports 134 in adjacent layers. The configuration of the output ports 134, the number of the output ports 134 and the spacing between the output ports 134 of the optical switch 130 may be selected to configure the optical switch 130 to provide one or any combination of a particular vertical angular resolution (VAR) as shown in FIG. 2B, angular FOV (AFOV) as shown in FIG. 2C, horizontal FOV (HFOV) as shown in FIG. 2D and/or horizontal angular resolution (HAR) as shown in FIG. 2D. The AFOV is measure relative to a horizontal reference plane, such as the horizontal plane in which the output port 134 are mounted or otherwise located, e.g. a horizontal plane of the housing 135 of the LIDAR scanning system 100.

As shown in FIG. 2B, when the angular offset by an equally amount, the angular offset defines a vertical angular resolution (VAR) of the LIDAR scanning system 100. The output ports 134 may be arranged in a number of annular rings. Within each layer, the output ports 134 and microlenses 136 are arranged in an annular ring, radially offset (spaced apart) from each other. When the radially offset by an equal amount (i.e., when evenly spaced around the periphery of the housing 135 (e.g., mounted in and exposed by from an external surface of the housing 135), the radial offset defines a horizontal angular resolution of the LIDAR scanning system 100. The paired or otherwise corresponding detectors for the output ports 134 may be located proximate to the output ports 134 in the housing 135. For example, the pair detectors may be similarly arranged in an annular ring, evenly spaced apart around the periphery of the housing 135 (e.g., mounted in and exposed by from an external surface of the housing 135).

As shown in FIG. 2C, the output ports 134 may be configured so that there is no gap in an angular FOV (HFOV) of adjacent output ports 134. In FIG. 2C, the output ports 134 are configured to collectively provide an AFOV of Θ degrees between a lower bound and upper bound. The AFOV of adjacent output ports 134 may be partially overlapping.

As shown in FIG. 2D, the output ports 134 may be configured so that there is no gap in a horizontal FOV (HFOV) of adjacent output ports 134. In FIG. 2D, the output ports 134 are configured to collectively provide a 360 degree HFOV to capture the entire surrounding environment of the host system in which the LIDAR scanning system 100 is incorporated. The HFOV of adjacent output ports 134 may be partially overlapping.

In one example configuration, the output ports 134 of the optical switch 130 are selected to configure the optical switch 130 to provide one or any combination of a 360 degree HFOV, a 30 degree AFOV (e.g., ranging from +15 degree to −15 degree relative to a horizontal reference), a VAR of 2 degrees, and a HAR of 0.1 degree. The optical switch 130 may comprise 3,600 output ports 134 in each layer, with the output ports 134 of each layer being evening spaced about in an annular arrangement of the generally cylindrical housing 135. The output ports 134 of each layer are radially offset from each other by 0.1 degree to provide a HAR of 0.1 degree and an HFOV of 360 degrees. A typical 2 cm by 2 cm silicon chip may provide up to 4,096 output ports. The output ports 134 of the optical switch 130 may be arranged in 16 layers, with the output ports 134 of each layer are angularly offset from the output ports 134 in adjacent layers by 2 degrees to provide a VAR of 2 degrees and an AFOV of 30 degrees (e.g., ranging from +15 degree to −15 degree relative to a horizontal reference). This results in a stackup of 16 layers (i.e., 16×2 cm×2 cm). Each layer has fairly small thickness, typically 1 to 2 mm, which is technology dependent. Other parameters may also affect thickness. This results in a stackup of between 1.6 cm and 3.2 cm and a 2 cm×2 cm footprint.

In the foregoing example, it is assumed that 3,600 output ports 134 of an individual optical switch 130 are mapped to 360 degree AFOV so as each output port 134 covers an area related to 0.1 degree. As explained above, microlens arrays in combination with beam collimators may be used to achieve the same HFOV and resolution using a different architecture. Different architectures may as well be considered for arranging horizontal switches with smaller sizes to achieve the desired AFOV. For instance, an optical switch with 512 output ports may be placed adjacent to each other to achieve the desired resolution as compared to use higher port counts switches.

Figure 3A:
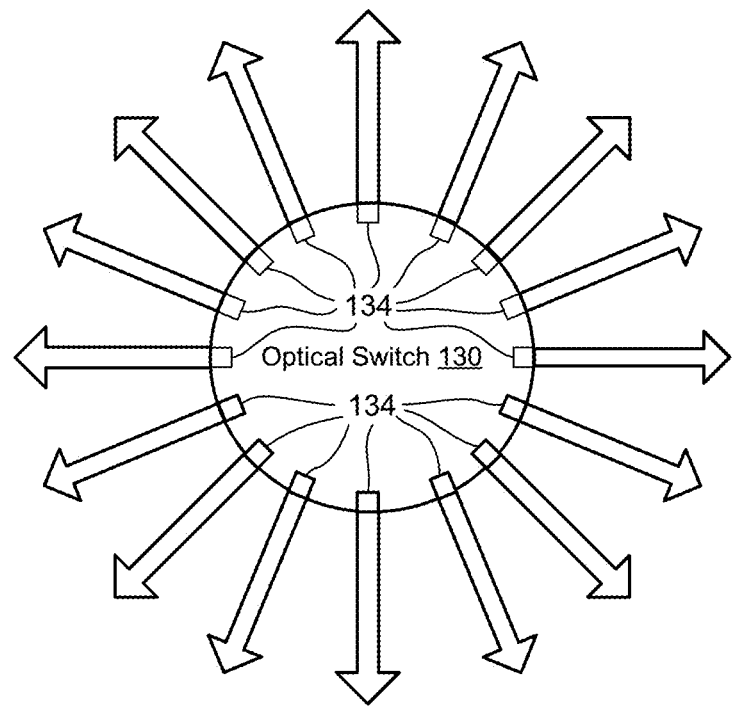
FIG. 3A is a schematic diagram of a 16-port optical switch in which each output port is pointed to a different direction in space to over a 360 degree coverage area.
Figure 3B:
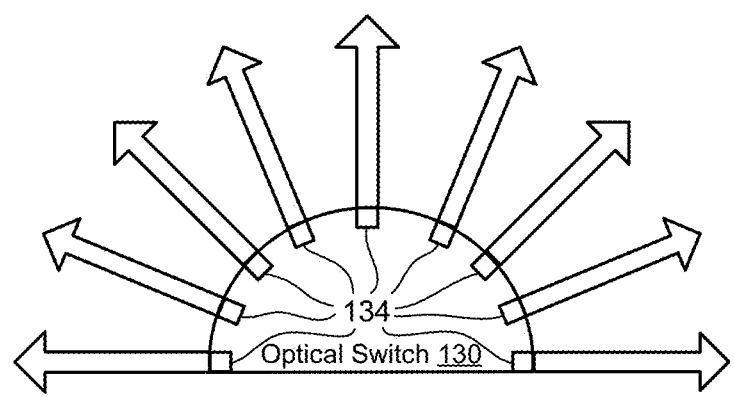
FIG. 3B is a schematic diagram of a 9-port optical switch in which each output port is pointed to a different direction in space to over a 180 degree coverage area.

FIG. 3A illustrates an example diagram of a 16-port optical switch in which each output port 134 is pointed to a different direction in space to provide a 360 degree HFOV. Alternatively, multiple optical switches, possibly each with its own laser source 120, may be used to obtain a 360 degree HFOV. For example, FIG. 3B illustrate an example a 9-port optical switch in which each output port 134 is pointed to a different direction in space to over a 180 degree HFOV. Two of the 9-port optical switches of FIG. 3B may be positioned to scan in different directions and the resultant data may be combined to obtain a 360 degree HFOV from two discrete 180 degree HFOVs obtained by the two 9-port optical switches. The HFOV however may be selected to be any number and is not limited to 180 or 360 degrees.

When more than one laser source 120 is provided, the optical switch 130 may have m input ports 132 rather than only a single input port 132 as described above, where m is the number of laser sources 120. Each of the laser sources 120 is optically coupled to the optical switch 130 via a respective input port 132. Alternatively, each laser source 120 may have its own dedicated optical switch 130. A variety of architectures may be considered for optimizing such schemes.

The LIDAR scanning system 100 described herein provides flexibility for port to direction mapping which may be optimized or customized pending the application requirements or technical challenges. By arranging the output ports 134 of the optical switch 130 in a way that different ports corresponding to different directions, an area of the environment may be scanned by controlling the optical switch 130, in particular, by cycling the laser source 120 through each of the output ports 134 of the optical switch 130, typically in a sequence. For example, when the output ports 134 are arranged in a number of layers, the scanning sequence may be, for example, port-by-port and layer-by-layer. When the output ports are arranged in annular rings, the scanning sequence may be port-by-port, column-by-column. The controller 110 controls a direction and time of scanning by controlling the optical switching blocks in the optical switch 130 to select an output port 134 in the plurality of output ports 134 through which the laser light is transmitted. By controlling the active output port 134 of the optical switch 130 at any given time, the controller 110 controls both the scanning direction and the scanning rate.

Two design considerations in the optical switch 130 are coupling loss from the optical switch 130 to the air, and scalability issue. A coupling loss occurs when the beam leaves the optical switch 130. That is, the level of optical power of the beam decreases as it leaves the optical switch 130. The loss depends on the technology but is typically has a maximum of 5-7 dB, possibly as low as 2-3 dB using newer technology. Coupling loss is a consideration when selecting the laser source 120 as well as the number of stages (equivalent of the number of ports) of the optical switch 130. The requirement for the optical power of the beam leaving the optical switch 130 depends on the application requirements of LIDAR scanning system, such as coverage distance (a reliable and valid reading may be achieved and reported) as well as resolution (ability to differentiate two objects at the required distance) as well as the sensitivity of the detector system 140 to detect and differentiate optical reflected beams. The power of the laser source 120 may be selected such that the optical power of the beam leaving the optical switch 130 is sufficiently enough that the desired coverage is obtained. Increasing the power of the laser source 120 may impart higher costs and/or complexity.

Figure 4:
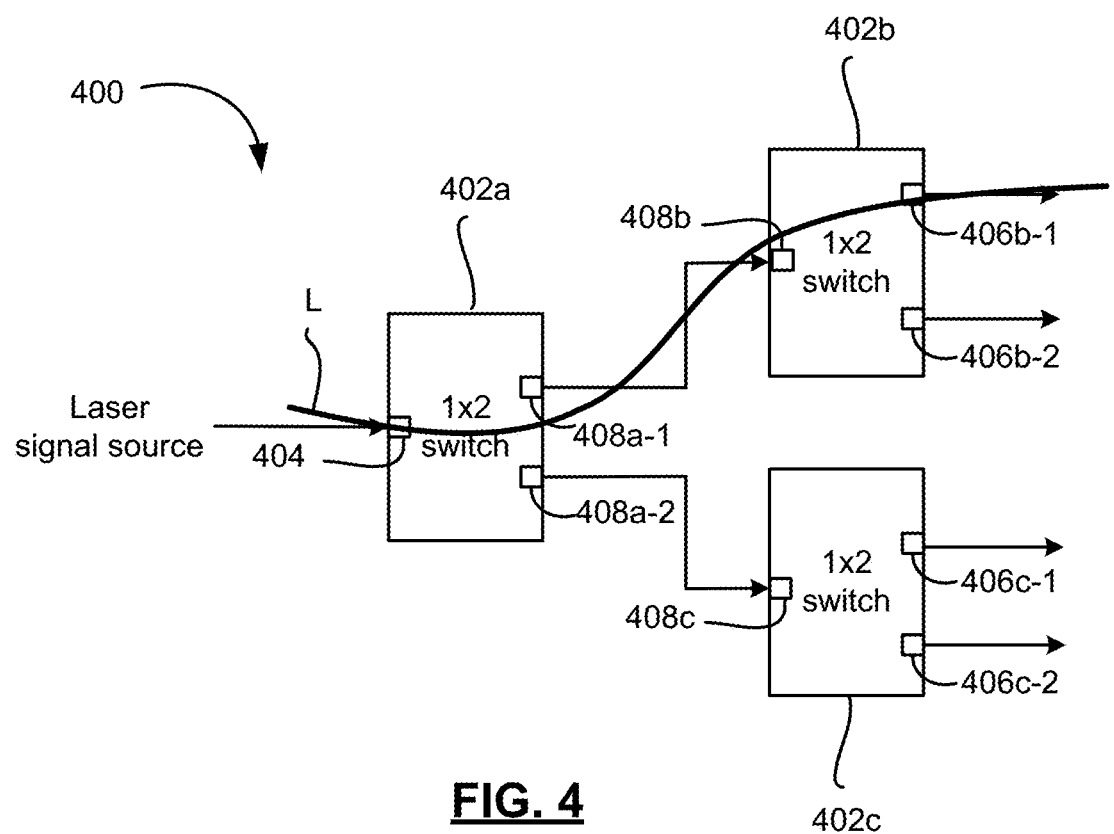
FIG. 4 is a block diagram of a 1×4 optical switch for directing an optical signal to four different directions constructed using a number of 1×2 optical switching blocks in accordance with one example embodiment of the present disclosure.

The optical switch 130 may be constructed, or at least modelled, as a number of 1×2 switches. Referring to FIG. 4, for purposes of explanation a block diagram of a 1×4 optical switch 400 for directing an optical signal to four different directions constructed using a number of 1×2 optical switching blocks in accordance with one example embodiment of the present disclosure is shown. The optical switch 400 comprises three 1×2 optical switching blocks denoted 402a, 402b, and 402c, respectively. The optical switching block 402 comprises an input port denoted 404 coupled to the laser source 120. The optical switching blocks 402b and 402c also each comprise 2 output ports denote 406b-1, 406b-2 and 406c-1, 406c-2 respectively, 406a-1 and 406a-2. Intermediate connecting ports 408a-1 and 408b connect optical switching block 402a to optical switching block 402b, and an intermediate connecting ports 408a-2 and 408c connect optical switching block 402a to optical switching block 402c. In the shown example, the optical switch 400 is set so that the laser light passes from the input port 404, through intermediate connecting ports 408a-1 and 408b, to output port 406b-1, these ports being switched opening and defining a path for the transmitted light from the laser source 120 denoted by reference character L. The intermediate connecting ports 408 transmit laser light to the downstream optical switching blocks 402b and 402c which provide terminal optical switching blocks for transmitting the laser light to the environment for scanning.

Employing 1×2 switches for an output port switch, $\log_2(n)$ stages are required. The loss per 1×2 switch cell is denoted $L_{switch}$. Different switching technology imposes different losses per 1×2 switch. For safety considerations, it may be desirable for the output power of the beam to follow the class I laser safety, i.e., less than 10 dBm. However, there is no (or minimal) requirement on the power of the laser ($P_{laser}$) source optically coupled to the optical switch 130. That is, laser, $P_{laser}$ may be as high as 1 Watt. Depending on the implementation, there may be a coupling loss from the laser beam to the optical switch 130 and from the optical switch 130 to the free space (e.g., air), denote $L_{coupling}$. The coupling loss is technology and medium dependent. The equation may be simplified by assuming that coupling of the laser light to the switch and from the switch to the environment are the same and equals to $L_{coupling\ (dB)}$, resulting in an equation for the power of the laser may be defined by equation (1) below:

$$P_{beam(dBm)} = P_{laser(dBm)} - 2 \times L_{coupling(dB)} - \log_2(n) - L_{switch(dB)} \quad (1)$$

As a worst case example, if silicon photonic based optical switches are used, a worst case estimation of the aforementioned factors for n=1024 output ports are, $L_{switch}$=0.5 dB for thermal switches, $L_{coupling}$=4 dB, which results in a $P_{beam}$ of approximately 10 dBm, which may be achieved with $P_{laser}$ of approximately 1 Watt which is relative easily obtainable at negligible cost. Even with 3,600 ports rather than 1024 ports, this still results in a $P_{laser}$ of approximately 1 Watt.

If substantially more ports are required for increased resolution or scanning rate, amplifiers or a higher power laser source may be used. Different architectures using a customized arrangement of small switches and or multiple laser sources may also be employed. Scalability relates to the beam (spatial) size of the optical signal when leaving the optical switch 130. The beam has a minimum size to satisfy a desired spatial resolution. This means that the size of the beam at each output port 134 of the optical switch 130 is at least the size of the minimum beam size, which depends on the resolution of the LIDAR scanning system 100.

The divergence angle (or beam radius) of the output beam of the output ports 134 is equal to the angular resolution (to within a factor of less than 2). For Gaussian beams, the divergence angle may be equated with the maximum intensity of the beam generated by the laser source 120 by equation (2) below:

$$\text{Divergence (full-angle, radian)} = \frac{1}{e^2}(\text{maximum intensity of beam}) \quad (2)$$

For a horizontal angular resolution of 0.1 degree, the output beam divergence is 0.1 degree or approximately 0.002 radians. For a Gaussian beam, the divergence and beat waist radius may be calculated by equation (3) below:

$$\text{Divergence (full-angle, radian)} = \frac{4\lambda}{2\pi(\text{beam waist radius})} \quad (3)$$

In equation (3), $\lambda$ is the wavelength of the laser source used for the LIDAR application (all other optical elements such as switches have to be designed to operate at this wavelength) which depends on the technology, and requirements of the laser 120. The beam waist (or beam focus) of the laser beam is a location along the propagation direction where the beam radius has a minimum. The mean waist radius is the beam radius at this location. As an example, the value of $\lambda$ may be in the infrared when silicon photonics are used in the construction of the optical switch 130. In an example configuration having a wavelength of 1550 nm and a beam divergence of approximately 0.002 radians, the beam waist radius is approximately 0.6 mm, resulting in abeam waist diameter of approximately 1.2 mm. This translates to a size (diameter) of approximately 1 mm for the output ports 134 of the optical switch 130. As noted above, a microlens or a microlens array, such as those made by Precision Optics Corporation, may be located at each output port 134 to assist in focusing the beam.

Other changes may be to address power coupling loss and scalability, including changing the architecture of the optical switch and/or the coupling technologies to minimize the issues, for example, when the scanning rate or resolution increases. Higher resolutions, more number of directions may be supported with multiple cascades of optical switches and or multiple layers of switches using 2D, 2.5D or 3D interposers, hybrid schemes, etc.

An area may be scanned by controlling the optical switch 130 by cycling the laser source 120 through each of the output ports 134 of the optical switch 130. There is no technological limitation on the number of output ports 134 of the optical switch 130. Individual switch modules may be controlled in at millisecond to microsecond speed, depending on the switching technology. The scanning rate (speed) may be set by the application requirements (e.g., customer requirements). The control of the optical switch 130 by the controller 110 for the purpose of spatially sweeping the beam makes the LIDAR scanning system of the present disclosure reliable.

The requirements for LIDAR scanning systems to generate a 3D map are generally similar but may be vary in specifics between applications. Generally, the LIDAR system needs to send laser pulses in a number of different directions (e.g., different elevations and azimuth) at a relatively high rate. This imposes technical challenges, especially when mechanical rotation is involved. Constraints on the LIDAR system may include cost, performance (e.g., accurate range measurements, resolution (range, elevations and azimuth), power consumption, speed of scanning to generate 3D views), size/footprint (small size is highly desirable), and reliability (including design, fabrication, control, calibration, safety, etc.).

LIDAR scanning systems conventionally comprise one of two types: mechanical scanning and phased array solid state scanning. In mechanical scanning systems, one or more laser transmitter and receiver pairs are rotated or otherwise physically moved in different directions, for example, by scanning and moving the LIDAR unit up, down, left and right, spinning the LIDAR unit in a circle, both. Mechanical scanning systems are relatively large in size, relatively expensive, and unreliable for some applications (e.g., consumer use) because the LIDAR units are constantly or frequently moving.

In phased array solid state scanning systems, an optical phased array is used as a transmitter which steer pulses of laser light by shifting the phase of a laser pulse as it is projected through the array. Phased array solid state scanning systems are relatively expensive, require complex control of electro-optics, experience beam divergence problems, require extensive signal processing to handle side lobes formed in beam steering, are relatively large in size, require a multiple laser sources, and may often present fabrication problems.

The present disclosure discloses a LIDAR scanning system comprising a multi-port optical switch used to change the direction of a laser beam to perform 3D scanning of the environment rather than mechanical scanning and phased array solid state scanning. The multi-port optical switch may be used to efficiently direct the laser in different directions to cover the entire scanning area by switching the laser beam from one output port to another output port until the entire environment has been scanned.

Prospective advantages of the LIDAR scanning system of the present disclosure over mechanical scanning and phased array solid state scanning systems in that it has no moving parts, has a relatively simple control scheme with based on relatively simple architectures to support different application requirements, relatively inexpensive, relatively easy to implement, has a relatively small footprint (size), has relatively low power consumption (e.g., negligible power consumption), has a relatively high reliability due to being based on optical switching technology developed by the telecommunication industry such as MEMS, LCoS, SiPh, etc. that is relatively mature, well-researched and well-practiced in the telecommunication industry, may be relatively easy incorporated into a host system, and is scalable for higher resolutions.

Although optical switching is issued in the telecommunication industry, the application requirements of the telecommunication industry differ significantly from those of LIDAR scanning systems. For example, the telecommunication industry typically requires high signal quality whereas a lower signal quality is often acceptable in LIDAR applications. Accordingly, although optical switching is known in telecommunications, the use of an optical switch for LIDAR has not been previously considered and the design of an optical switch for LIDAR is not a straightforward process based on optical switches in the telecommunication industry due to the differences in application requirements, among other factors.

Figure 5:
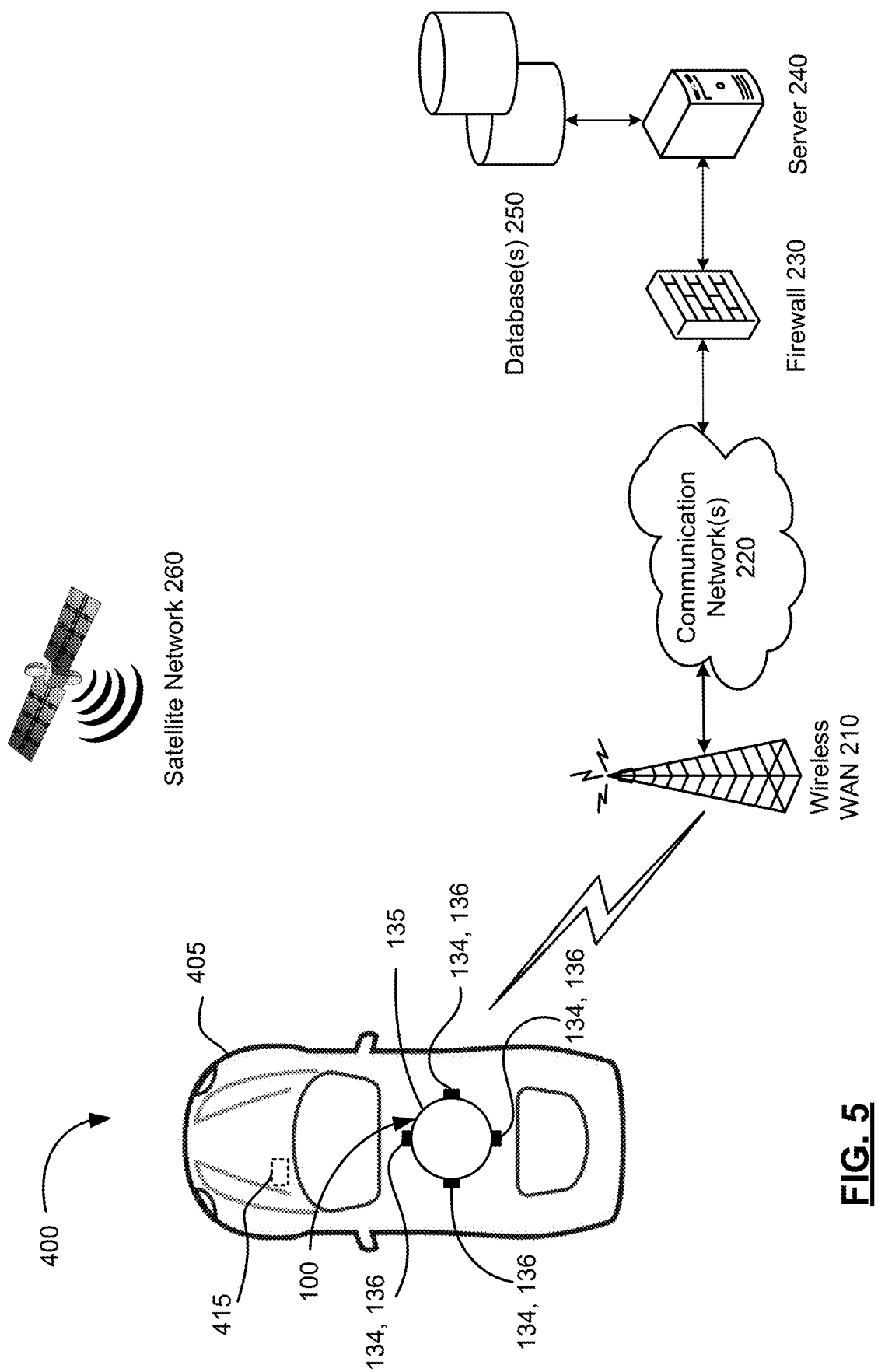
FIG. 5 is a schematic diagram of a vehicle localization system in accordance with one example embodiment of the present disclosure.

FIG. 5 is a schematic view illustrating selected components of a vehicle localization system 400 incorporating the LIDAR scanning system 100 in accordance with one example embodiment of the present disclosure. In FIG. 5, the LIDAR scanning system 100 is incorporated into a host system in the form of a vehicle 405 such as a car. The LIDAR scanning system 100 is mounted or otherwise located on the top (e.g., roof) of the vehicle 405 within the housing 135. A plurality of output ports 134 and paired microlenses 136 are grouped into four sensor areas located at the front, rear, left side and right side of the housing 135 (and consequently the vehicle 405), respectively, to scan the environment in front, rear, left side and right side of the vehicle 405.

Figure 6:
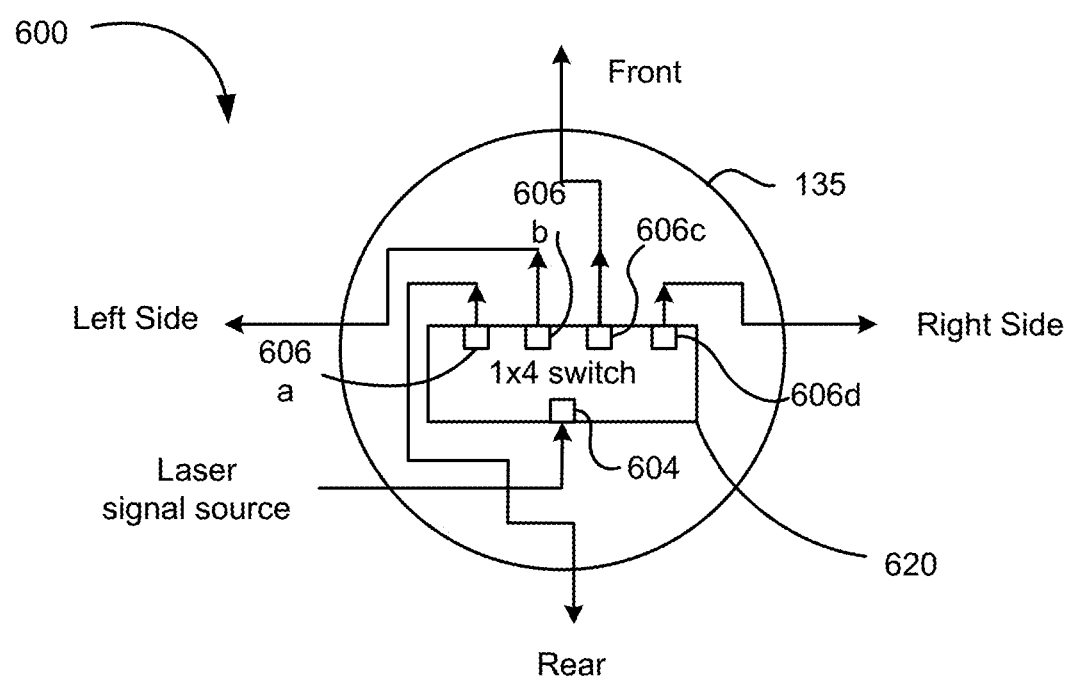
FIG. 6 is a block diagram of a 1×4 optical switch for directing an optical signal to four different directions in accordance with one example embodiment of the present disclosure.

In the vehicle localization system 400 of FIG. 5, the output ports 134 and microlenses 136 are oriented in four different directions to scan the environment in the front, rear, left side and right side of the vehicle 405. FIG. 6 is a block diagram of a 1×4 optical switch 600 that may be used in the vehicle localization system of FIG. 6 to direct laser light in four different directions, such as in the direction of the front, rear, left side and right side of the vehicle 406. The optical switch 600 includes 1 input port 604 and 4 output ports 606, represented individually by reference numerals 606a, 606b, 606c, and 606d oriented in the direction of the front, rear, left side and right side of the vehicle 406. In the shown example, the optical switch 600 includes a housing 620 in which the output ports 606 are located. The output ports 606 may be connected to transmitting optics (not shown), such as the microlenses 136, via fiber optic cables or the like (not shown).

The vehicle localization system 400 is part of a vehicle control system 415 embedded in a vehicle 405. The vehicle control system 415 is coupled to a drive control system 450 and a mechanical system 490 of the vehicle 405, as described below. In other embodiments, the vehicle localization system 400 may be a dedicated system. The vehicle control system 415 allows the vehicle 405 to be operable in a fully-autonomous, semi-autonomous or fully user-controlled mode.

The vehicle localization system 400 comprises a plurality of sensors 410 located about the vehicle 405 and one or more wireless transceivers 430 each coupled to a controller of the vehicle control system 415. The plurality of sensors 410 comprise one or more digital cameras 412, at least one LIDAR scanning system 300 comprises at least one LIDAR scanning unit, one or more synthetic aperture radar (SAR) units 416, an inertial measurement unit (IMU) 418 and an electronic compass 419. The sensors 410, when active, repeatedly (e.g., in regular intervals) sense (or scan) information and provide the sensed information to the vehicle control system 415, including the vehicle localization system 400, in real-time or near real-time.

Using the sensors 410, the vehicle localization system 400 may collect information about a local environment of the vehicle 405, any immediately surrounding obstacles, (for example, using the cameras 412) as well as information from a wider vicinity (for example, using the LIDAR scanning system 300 and SAR units 416 may collect information from an area of up to 100 m radius or more around the vehicle 405). The vehicle localization system 400 may also collect information about the position and orientation of the vehicle 405 using the IMU 418. Using the IMU 418 and other sensors the vehicle control system 415 may determine the linear speed (e.g. odometer), angular speed, acceleration, and/or tire grip of the vehicle 405, among other factors.

One or more cameras 412 and/or one or more SAR units 416 may be co-located with output ports 334 and optical lens 336 of the optical switch 330 of the LIDAR scanning system 300 in some embodiments. Alternatively, in other embodiments the cameras 412 and/or SAR units 416 may be located elsewhere or even omitted.

The wireless transceivers 430 enable the vehicle control system 415 to exchange data and optionally voice communications with a wireless wide area network (WAN) 210. The vehicle localization system 400 may use the wireless WAN 210 to access a server 240, such as a driving assist server, via one or more communications networks 220, such as the Internet. The server 240 may be implemented as one or more server modules and is typically located behind a firewall 230. The server 240 may be connected to one or more database(s) 250 containing data for use by the vehicle control system 415.

The vehicle localization system 400 also includes a satellite receiver 432. The vehicle localization system 400 may use signals received by the satellite receiver 432 from the plurality of satellites in the satellite network 260 to determine its position. The satellite network 260 typically comprises a plurality of satellites which are part of at least one Global Navigation Satellite System (GNSS) that provides autonomous geo-spatial positioning with global coverage. For example, the satellite network 260 may be a constellation of GNSS satellites. Example GNSSs include the United States NAVSTAR Global Positioning System (GPS) or the Russian GLObal NAvigation Satellite System (GLONASS). Other satellite navigation systems which have been deployed or which are in development include the European Union's Galileo positioning system, China's BeiDou Navigation Satellite System (BDS), the Indian regional satellite navigation system, and the Japanese satellite navigation system.

Figure 7:
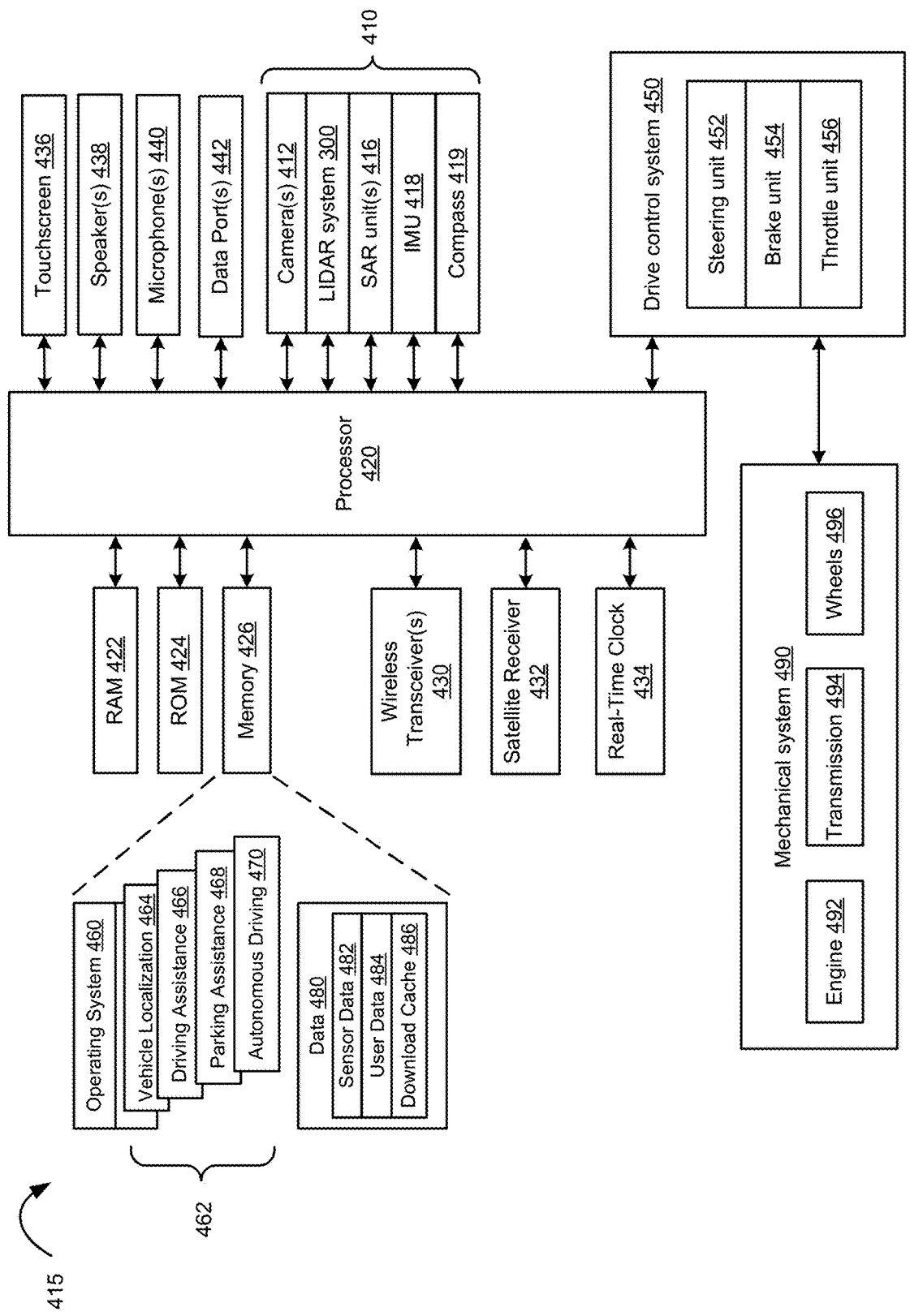
FIG. 7 is a block diagram of a vehicle control system embodying the vehicle localization system of FIG. 1.

Reference is next made to FIG. 7 which illustrates select components of the vehicle control system 415 in accordance with an example embodiment of the present disclosure. The processor 420 is coupled to a plurality of components via a communication bus (not shown) which provides a communication path between the components and the processor 420. The processor 420 is coupled to a drive control system 450, Random Access Memory (RAM) 422, Read Only Memory (ROM) 424, persistent (non-volatile) memory 426 such as flash erasable programmable read only memory (EPROM) (flash memory), one or more wireless transceivers 430 for exchanging radio frequency signals with a wireless network 210, a satellite receiver 432 for receiving satellite signals from a satellite network 260 that comprises a plurality of satellites which are part of a global or regional satellite navigation system, a real-time clock (RTC) 434, and a touchscreen 436.

The wireless transceivers 430 may comprise one or more cellular (RF) transceivers for communicating with a plurality of different radio access networks (e.g., cellular networks) using different wireless data communication protocols and standards. The vehicle localization system 400 may communicate with any one of a plurality of fixed transceiver base stations of the wireless WAN 210 (e.g., cellular network) within its geographic coverage area. The vehicle localization system 400 and/or vehicle control system 415 may send and receive signals over the wireless WAN 210. The wireless transceivers 430 may comprise a multi-band cellular transceiver that supports multiple radio frequency bands.

The wireless transceivers 430 may also comprise a wireless local area network (WLAN) transceiver for communicating with a WLAN (now shown) via a WLAN access point (AP). The WLAN may comprise a Wi-Fi wireless network which conforms to IEEE 802.11x standards (sometimes referred to as Wi-Fi®) or other communication protocol.

The wireless transceivers 430 may also comprise a short-range wireless transceiver, such as a Bluetooth® transceiver, for communicating with a mobile computing device, such as a smartphone or tablet. The wireless transceivers 430 may also comprise other short-range wireless transceivers including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

The touchscreen 436 comprises a display such as a color liquid crystal display (LCD), light-emitting diode (ED) display or active-matrix organic light-emitting diode (AMO-LED) display, with a touch-sensitive input surface or overlay connected to an electronic controller. Additional input devices (not shown) coupled to the processor 420 may also be provided including buttons, switches and dials.

The vehicle control system 415 also includes one or more speakers 438, one or more microphones 440 and one or more data ports 442 such as serial data ports (e.g., Universal Serial Bus (USB) data ports). The system may also include other sensors such as tire pressure sensors (TPSs), door contact switches, light sensors, proximity sensors, etc.

The vehicle control system 415 also includes a drive control system 450 that serves to control movement of vehicle 405. The drive control system 450 comprises a steering unit 452, a brake unit 454 and a throttle unit 456, each of which may be implemented as software modules or control blocks within the drive control system 450. The steering unit 452, brake unit 454 and throttle unit 456, when in fully or semi-autonomous driving mode, received path information received from a path planning system (not shown) and generate control signals to control the steering, braking and throttle of the vehicle 405, respectively to drive a planned path. The drive control system 450 may include additional components to control other aspects of the vehicle 405 including, for example, control of turn signals and brake lights.

The mechanical system 490 receives control signals from the drive control system 415 to operate the mechanical components of the vehicle 405. The mechanical system 480 effects physical operation of the vehicle 405. The mechanical system 490 comprises an engine 492, a transmission 494 and wheels 496. The engine 492 may be a gasoline-powered engine, a battery-powered engine, or a hybrid engine, for example. Other components may be included in the mechanical system 490, including, for example, turn signals, brake lights, fans and windows.

A graphical user interface (GUI) of the vehicle control system 415 is rendered and displayed on the touchscreen 436 by the processor 420. A user may interact with the GUI using the touchscreen and optionally other input devices (e.g., buttons, dials) to display relevant information, such as navigation information, driving information, parking information, media player information, climate control information, etc. The GUI may comprise a series of traversable content-specific menus.

The memory 426 has stored thereon operating system software 460 that is executed by the processor 420 as well as a number of applications 462 in addition to the GUI. The applications 460 include vehicle localization 464, driving assistance 466, parking assistance 468 and autonomous driving 470 for fully or semi-autonomous driving. Other applications such as mapping, navigation, climate control, media player, telephone and messaging applications, etc. are also stored in the memory. The vehicle localization 464, when executed by the processor 420, causes the vehicle control system 415 to perform vehicle localization operations, such as determining a distance from the vehicle to one or more objects in an environment of the vehicle 405 based on a time between a transmission of beams of laser light and a reception of a reflection of the beams of laser light and generating a three dimensional (3D) map of the environment based on the determined distance to one or more objects in the environment.

The memory 426 also stores a variety of data 480. The data 480 may comprise sensor data 482 sensed by the sensors 410, user data 484 comprising user preferences, settings and optionally personal media files (e.g., music, videos, directions, etc.), and a download cache 486 comprising data downloaded via the wireless transceivers 430. The download cache 486 may be deleted periodically, for example, after a predetermined amount of time. System software, software modules, specific device applications, or parts thereof, may be temporarily loaded into a volatile store, such as RAM 422, which is used for storing runtime data variables and other types of data or information. Data received by the vehicle control system 415 may also be stored in the RAM 422. Although specific functions are described for various types of memory, this is merely one example, and a different assignment of functions to types of memory may also be used.

Figure 8:
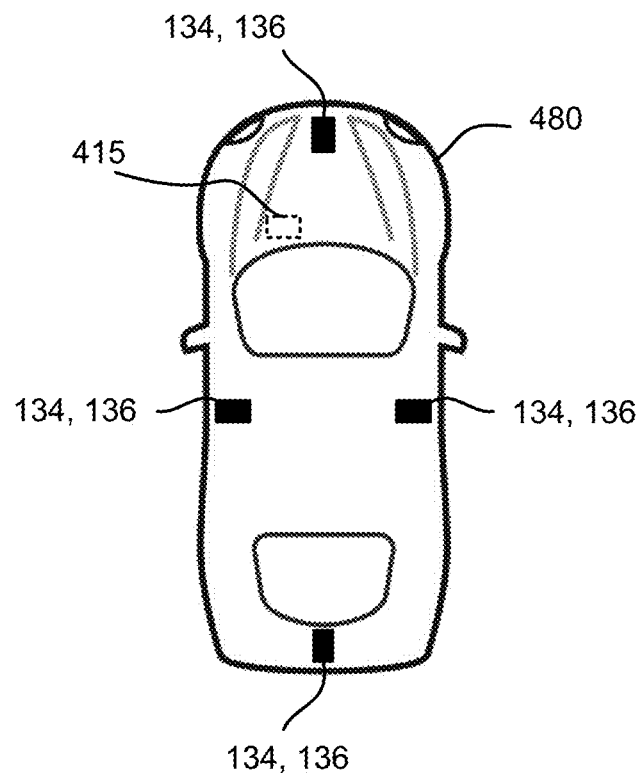
FIG. 8 is a schematic diagram of a vehicle incorporating a LIDAR scanning system having output ports located at the front, rear, left side and right side of the vehicle.

FIG. 8 is a schematic diagram of a vehicle 480 incorporating a LIDAR scanning system having output ports located at the front, rear, left side and right side of the vehicle 480 in accordance with another example embodiment of the present disclosure. Rather than being mounted in a housing 135 of the LIDAR scanning system 100 as in FIG. 4 described above, the output ports 134 and microlenses 136 and paired detectors are mounted to, or incorporated in, different body parts of the vehicle 480 at different locations around the vehicle 480. In the shown example, the output ports 134 and microlenses 136 are grouped in four sensor areas located at the front, rear, left side and right side of the vehicle 480, respectively, to scan the environment in front, rear, left side and right side of the vehicle 480, respectively.

For convenience, the present disclosure describes example embodiments with reference to a motor vehicle, such as a car, truck, bus, boat, aircraft, warehouse equipment, construction equipment, tractor or other farm equipment. The teachings of the present disclosure are not limited to any particular type of vehicle, and may be applied to vehicles that do not carry passengers as well as vehicles that do carry passengers. The teachings of the present disclosure may also be implemented in non-vehicular mobile robots including, but not limited to, autonomous vacuum cleaners, rovers and lawn mowers.

Reference is now made to FIG. 8 which illustrates a flowchart of a method 900 of controlling a LIDAR scanning system in accordance with one embodiment of the present disclosure. The method 900 may be carried out by software executed, for example, by the processor 420 of the vehicle control system 415. Coding of software for carrying out such a method 900 is within the scope of a person of ordinary skill in the art provided the present disclosure. The method 900 may contain additional or fewer processes than shown and/or described, and may be performed in a different order. Machine readable code executable by the processor 420 to perform the method 900 may be stored in a non-transitory machine readable medium such as the memory 426 of the vehicle control system 415.

At 902, the controller 110 controls the laser 120 to emit laser light.

At 904, the controller 110, controls the optical switch 130, to control a direction in which the laser light is transmitted by selecting an active output port 134 in the plurality of output ports 134 through which the laser light is transmitted.

Figure 9:
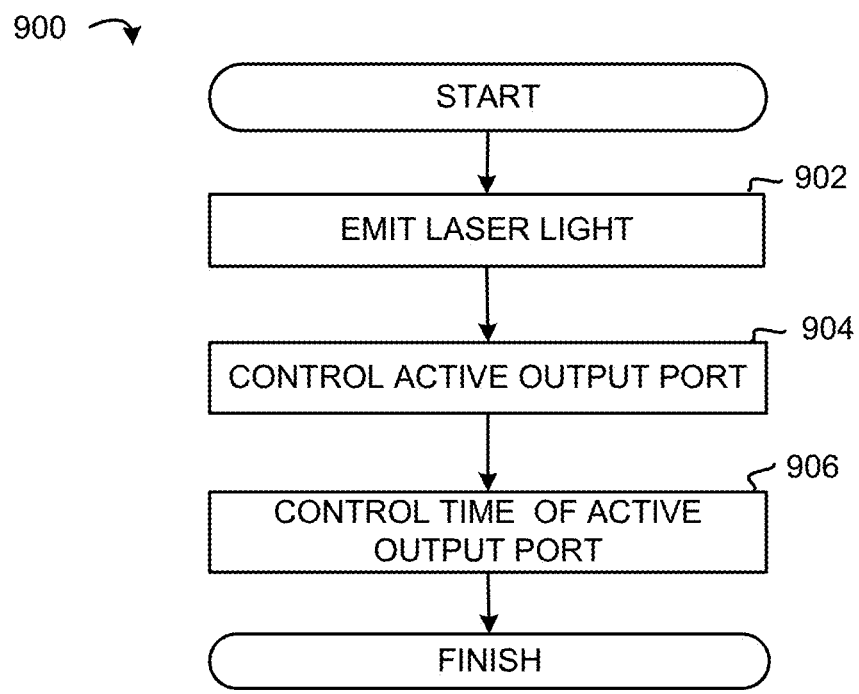
FIG. 9 is a flowchart illustrating an example method of controlling a LIDAR scanning system in accordance with one example embodiment of the present disclosure.

At 906, the controller 110, controls the optical switch 130, to control a time each output port is the active output port to set a scanning rate. The operations 904 and 906 may occur concurrently even though the operations 904 and 906 are shown separately in FIG. 9.

The laser light cycles through each of the output ports 134 of the optical switch 130 in a scanning cycle. In some examples, the output ports 134 are arranged in a number of layers, the direction in which the laser light is transmitted is defined by a scanning sequence in which the active output port 134 is selected sequentially layer-by-layer and port-by-port. In some examples, the output ports 134 are arranged in a number of annular rings, the direction in which the laser light is transmitted is defined by a scanning sequence in which the active output port 134 is selected column-by-column and port-by-port.

By arranging the output ports 134 of the optical switch 130 in a way that different ports corresponding to different directions, an area of the environment may be scanned by controlling the optical switch 130, in particular, by cycling the laser source 120 through each of the output ports 134 of the optical switch 130. By controlling the active output port 134 of the optical switch 130 at any given time, the controller 110 controls both the scanning direction and the scanning rate.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

All values and sub-ranges within disclosed ranges are also disclosed. Also, although the systems, devices and processes disclosed and shown herein may comprise a specific number of elements/components, the systems, devices and assemblies may be modified to include additional or fewer of such elements/components. For example, although any of the elements/components disclosed may be referenced as being singular, the embodiments disclosed herein may be modified to include a plurality of such elements/components. The subject matter described herein intends to cover and embrace all suitable changes in technology.

Although the present disclosure is described, at least in part, in terms of methods, a person of ordinary skill in the art will understand that the present disclosure is also directed to the various components for performing at least some of the aspects and features of the described methods, be it by way of hardware (DSPs, ASIC, or FPGAs), software or a combination thereof. Accordingly, the technical solution of the present disclosure may be embodied in a non-volatile or non-transitory machine readable medium (e.g., optical disk, flash memory, etc.) having stored thereon executable instructions tangibly stored thereon that enable a processing device (e.g., a vehicle control system) to execute examples of the methods disclosed herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A LIDAR scanning system, comprising:
a housing;
a laser configured to emit laser light;
an optical switch including an input port optically coupled to the laser to receive the laser light emitted by the laser, and a plurality of output ports carried by the housing, wherein each of the plurality of output ports is oriented in a different direction, wherein each of the plurality of output ports is located at a different position about the housing to have a different field of view (FOV), wherein the output ports are arranged in a plurality of horizontal layers and the output ports of each horizontal layer are offset from each other around a periphery of the housing, wherein the plurality of horizontal layers are vertically aligned in a stack and the plurality of output ports of each horizontal layer provide a horizontal field of view (HFOV);
a detector subsystem positioned to receive reflected laser light; and
a controller coupled to the detector subsystem and the optical switch, the controller configured to:
control the optical switch to selectively couple at least one output port of the plurality of the output ports to the input port to transmit the laser light received from the laser in different directions to scan an environment of the LIDAR scanning system;
receive data signals from the detector subsystem corresponding to the received reflected laser light; and
process the data signals to determine a distance from the LIDAR scanning system to one or more objects in the environment of the LIDAR scanning system based on a time elapsed between a transmission of the laser light and a time of reception of the received reflected laser light.

2. The system of claim 1, wherein the plurality of output ports is configured to have an angular field of view (AFOV) of 30 degrees.

3. The system of claim 2, wherein the AFOV ranges between +15 degrees from a horizontal reference plane to −15 degrees from the horizontal reference plane.

4. The system of claim 1, wherein the optical switch comprises a plurality of optical switching blocks and wherein the controller controls a direction in which the laser light is transmitted by controlling the optical switching blocks in the optical switch to selectively couple the input port to the at least one output port of the plurality of output ports through which the laser light is transmitted.

5. The system of claim 1, wherein the controller is configured to perform a scanning cycle by controlling the optical switch to couple the input port to one of the plurality of output ports of the optical switch at a time.

6. The system of claim 1, wherein each horizontal layer has 3,600 output ports and the output ports of each horizontal layer are annularly offset from each other by 0.1 degree to provide a horizontal angular resolution (HAR) of 0.1 degree and an HFOV of 360 degrees.

7. The system of claim 1 consisting of 16 of the horizontal layers, wherein the output ports of each horizontal layer are angularly offset from the output ports in adjacent horizontal layers by 2 degrees to provide a vertical angular resolution (VAR) of 2 degrees and an AFOV of 30 degrees.

8. The system of claim 1, further comprising:
a plurality of microlenses, wherein each output port in the plurality of the output ports is optically coupled with a microlens to focus the laser light during transmission.

9. The system of claim 1, wherein each output port in the plurality of the output ports is optically coupled with a microlens array to focus the laser light during transmission.

10. The system of claim 1, wherein the controller is configured to generate a three dimensional (3D) map of the environment based at least on the determined distance to one or more objects in the environment.

11. The system of claim 1, wherein the detector subsystem comprises a plurality of detector elements for receiving reflected laser light each located at different positions about the LIDAR scanning system.

12. The system of claim 11, wherein each of the plurality of detector elements are located proximate to an output port of the optical switch with which the detector element is paired.

13. The system of claim 1, further comprising:
at least one other laser, each of the at least one other laser configured to emit light, wherein the light emitted by the laser and each of the at least one other laser have a different wavelength.

14. The system of claim 1, wherein the output ports of each horizontal layer are annually arranged in a ring and the HFOV is a 360 degree HFOV.

15. The system of claim 1, wherein the output ports of each horizontal layer are aligned with outputs of adjacent horizontal layers in columns.

16. The system of claim 1, wherein the horizontal layers are vertically spaced apart.

17. A method comprising:
controlling a laser of the LIDAR scanning system to emit laser light;
controlling an optical switch of the LIDAR scanning system comprising an input port and a plurality of output ports each oriented in a different direction to selectively couple the input port to at least one output port of the plurality of output ports to transmit laser light received from the laser in different directions to scan an environment of the LIDAR scanning system, wherein each of the plurality of output ports is located at a different position about a housing to have a different field of view (FOV), wherein the output ports are arranged in a plurality of horizontal layers and the output ports of each horizontal layer are offset from each other around a periphery of the housing, wherein the plurality of horizontal layers are vertically aligned in a stack and the plurality of output ports of each horizontal layer provide a horizontal field of view (HFOV);
receiving, from a detector subsystem of the LIDAR scanning system positioned to receive reflected laser light, data signals corresponding to the received laser light data signal; and
process the data signals to determine a distance from the LIDAR scanning system to one or more objects in the environment of the LIDAR scanning system based on a time elapsed between a transmission of the laser light and a time of reception of the received reflected laser light.

18. The method of claim 17, wherein controlling the optical switch comprises cycling through coupling the input port to each output port of the plurality of output ports of the optical switch in a scanning cycle.

19. The method of claim 18, wherein the direction in which the laser light is transmitted is defined by a scanning sequence in which each output port coupled to the input port is selected sequentially horizontal layer-by-horizontal layer and port-by-port.

20. The method of claim 18, wherein the plurality of output ports are arranged in a number of annular rings, the direction in which the laser light is transmitted is defined by a scanning sequence in which each output port coupled to the input port is selected column-by-column and port-by-port.

21. The method of claim 17, wherein controlling the optical switch is based on a scanning rate to control a time the input port is coupled to each output port.

22. The method of claim 17, wherein output ports of each horizontal layer are annually arranged in a ring and the HFOV is a 360 degree HFOV.

23. The method of claim 17, wherein the output ports of each horizontal layer are aligned with outputs of adjacent horizontal layers in columns.

24. The system of claim 17, wherein the horizontal layers are vertically spaced apart.

* * * * *